United States Patent [19]

Beadle et al.

[11] 4,006,119

[45] Feb. 1, 1977

[54] STABILIZED EPIHALOHYDRIN POLYMERS

[75] Inventors: Howard C. Beadle; Irving Gibbs, both of Norwalk, Conn.

[73] Assignee: R. T. Vanderbilt Company, Inc., Norwalk, Conn.

[22] Filed: Sept. 17, 1975

[21] Appl. No.: 614,146

[52] U.S. Cl. .................................... 260/45.75 N
[51] Int. Cl.² ...................................... C08K 5/39
[58] Field of Search ........................... 260/45.75 N

[56] References Cited

UNITED STATES PATENTS 2,628,952   2/1953   Sanders et al. ............. 260/45.75 N
3,726,841   4/1973   Mirolli et al. ............... 260/45.75 N

*Primary Examiner*—V. P. Hoke
*Attorney, Agent, or Firm*—Brumbaugh, Graves, Donohue & Raymond

[57] ABSTRACT

The specification relates to a stabilized composition of epihalohydrin homopolymers or copolymers of epihalohydrin with an alkylene oxide and a nickel salt of a branched-chain dialkyldithiocarbamate. The specification also relates to a process for stabilizing epihalohydrin homopolymers and copolymers against adverse effects of aging by compounding the polymers with a nickel salt of a branched-chain dialkyldithiocarbamate.

12 Claims, No Drawings

STABILIZED EPIHALOHYDRIN POLYMERS

BACKGROUND OF THE INVENTION

Epihalohydrin polymers are known to be susceptible to degradation reactions during aging and normal use of the vulcanizate. The principal degradation reaction is oxidation which may destroy the structural integrity of the polymer, as evidenced by the loss of molecular weight and the deterioration of physical properties to the point of mechanical failure. Such degradation may occur both before and after processing, for example, upon exposure to heat and light.

Degradation may also occur during the use of the finished article. For example, epihalohydrin polymers are employed extensively in the manufacture of hoses, gaskets, O-rings, and oils seals; all of these during use come in contact with various organic solvents, particularly, petroleum hydrocarbons. Such solvents, in combination with heat and weathering, cause articles composed of epihalohydrin polymers to deteriorate as evidence by softening and deformation of the articles.

In the past, a number of various nitrogen-containing compounds have been used to slow down oxidative degradation of epihalohydrin polymers. For example, U.S. Pat. No. 3,239,486 discloses various metal salts of dialkyldithiocarbamates as antioxidants for use with epihalohydrin polymers. Metal salts of dialkyltithiocarbamates have also been used as antioxidative stabilizers in other polymeric materials, e.g., in polyethers (French Pat. No. 1,439,852), in cellular rubber (Chemical Abstracts, Vol. 28 (1951), Abstract 10646(b) and in butadiene hydrocarbon elastomers (British Pat. No. 660,477). The nickel salt of di-n-butyldithiocarbamate has been utilized as an antioxidant for various epichlorohydrin vulcanization compositions (*Encyclopedia of Polymer Science and Technology*, Vol. 76, pp. 198–201; Chemical Abstracts, Vol. 76 (1972), Abstract 4715n; and Chemical Abstracts, Vol. 78, (1973), Abstract (137686h).

The prior art antioxidants, however, have imparted only limited overall aging resistance to epihalohydrin polymers with regard to degradation by oxygen, ozone, heat and ultraviolet light. Moreover, the prior art antioxidants often had to be supplemented with other stabilizers.

SUMMARY OF THE INVENTION

It has now been discovered that improved aging resistance can be imparted to epihalohydrin homopolymers and copolymers by compounding the polymer with at least one nickel (II) salt of a branched-chain dialkyldithiocarbamate having 3 to 5 carbon atoms. The nickel salts improve aging resistance not only when the polymer is under atmospheric conditions, but also when the polymer is in contact with organic solvents.

DETAILED DESCRIPTION OF THE INVENTION

As defined herein, a branched-chain dialkyldithiocarbamate is one in which the alkyl groups contain 3 to 5 carbon atoms selected from isopropyl, isobutyl, secondary butyl, secondary pentyl, isopentyl, tertiary pentyl and neopentyl. The preferred compounds are nickel (II) diisobutyldithiocarbamate and nickel (II) di-sec-butyldithiocarbamate.

The amount of the nickel salt of the branchedchain dialkyldithiocarbamate required to impart aging resistance can vary over a wide range, i.e., about 0.2 to 5 parts per 100 parts of epihalohydrin polymer. Preferably, the range should be between about 0.5 and 2 parts per 100 parts of opihalohydrin resin.

The nickel salts of the branched-chain dialkyldithiocarbamates used as an antioxidant in the present invention can be prepared by any appropriate method. In one method, molar equivalents of the corresponding dialkylamine, sodium hydroxide and carbon disulfide are reacted to form a sodium dialkyldithiocarbamate. The sodium dialkyldithiocarbamate is then converted to the nickel salt by treatment with nickelous sulfates hexahydrate.

The epihalohydrin polymers that can be stabilized by treatment with the nickel salts of the invention are also known (U.S. Pat. No. 3,158,150 which is incorporated herein by reference). These polymers include both homopolymers and copolymers of epihalohydrins. The homopolymers consist of repeating units of the following structure:

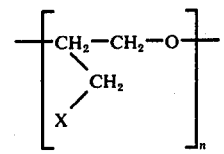

wherein X is a fluoro, chloro, bromo or iodo group, and n is a positive integer.

The nickel salts of the branched-chain dialkyldithiocarbamates may also be used with copolymers of epihalohydrin and one or more epoxides, e.g., alkylene oxides. Such copolymers are linked through the epoxide linkage although other polymerizable groups may be present. A typical epihalohydrin-alkylene oxide copolymer may be represented by the following structural formula

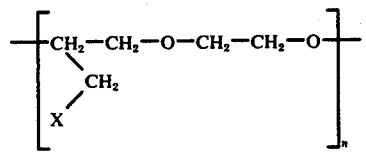

wherein X is a fluoro, chloro, bromo or iodo group, and n is a positive integer.

Other suitable copolymers for the present invention include, among other, epihalohydrin copolymerized with epoxide ethers, namely glycidyl ethers, trimethylene oxide (oxetane), alkyl substituted oxetane, alkoxy-substituted oxetane, and haloalkoxyalkyl-substutited oxetane.

The epihalohydrin polymers can be prepared by known methods, e.g., by the methods disclosed in U.S. Pat. No. 3,158,581 which is incorporated herein by reference. Typically, homopolymerization of an epihalohydrin is conducted in an inert solvent at moderate temperatures (usually below 100° C) in the presence of an organo aluminum catalyst. The catalyst may be modified by chelating agents, and other additives. By similar procedures, epihalohydrins may be copolymerized with alkylene oxides and the like.

Certain optional ingredients may also be included in the epihalohydrin polymers. For instance, the epihalohydrin polymers may be cross-linked with such conventional cross-linking agents as diamines, imidazolines, ureas, thioureas, and ammonium salts. Some specific cross-linking agents, among others, are 2-mercaptobenzimidazole, 2-mercaptoimidazoline, hexamethylenetetramine, triethylenetetramine, hexamethylenediamine carbamate, mercaptobenzothiazyl disulfide, trimethylthiourea, and piperazine hexahydrate. Accelerators and activators, such as dibasic lead phosphite, red lead, basic lead carbonate, diethylene glycol and triethanolamine, may be incorporated into the polymers. The epihalohydrin polymers may also contain pigments, fillers, and reinforcing agents, e.g., carbon black, alumina, hydrated silica, calcium carbonate, titanium dioxide and other suitable standard color pigments. The composition of the invention further may contain, optionally, other compounding ingredients, such as processing aids, lubricants and plasticizers.

The epihalohydrin polymers may be compounded with the nickel salts of the branched-chain dialkyldithiocarbamates and the optional ingredients by methods well-known in the art. For example, the epihalohydrin polymers and the nickel salts of the branched-chain dialkyldithiocarbamates may be mixed on a Banbury, and thereafter the vulcanizate may be sheeted off on a mill.

The conditions for curing the epihalohydrin polymers vary somewhat with the ingredients employed. Generally, however, curing is conducted at about 135° to 205° C for about 5 to 120 minutes.

The following example is intended to illustrate but not to limit the invention. Unless otherwise stated, all parts and percentages in the specification and claims are by weight.

EXAMPLE I

Vulcanizates A to F were prepared by compounding an epichlorohydrin polymer with certain dithiocarbamates and other compounding ingredients as indicated in Table 1 below. Vulcanizates A, B & C contained a dithiocarbamate in accordance with the invention, while vulcanizates D, E and F contained other dithiocarbamates. Vulcanizate G served as a control.

TABLE 1

| Component | Parts by Weight |
|---|---|
| Epichlorohydrin [a] | 100 |
| Zinc Stearate | 1 |
| Red Lead | 5 |
| Processing Lubricant [b] | 2 |
| Carbon Black [c] | 50 |
| Ethylene Thiourea | 1.5 |
| Dithiocarbamate | 1 |

[a] Herchlor C manufactured by Hercules, Inc.
[b] VANFRE AP manufactured by R.T. Vanderbilt Company, Inc.
[c] FEF Black (n-550)

These vulcanizates were press cured at 171° C for 20–45 minutes. The physical properties of the vulcanizates were then evaluated on the basis of stress, tensile strength, percent elongation and hardness, all of which were determined according to the ASTM D-412 Test Method.

The vulcanizates were aged subsequently in test tubes (Al blocks) for 4 and 7 days at 150° C and the aforementioned physical properties were reevaluated. The results are compiled in Table 2 here below.

TABLE 2

| Vulcanizate | Dithiocarbamate | Parts by Weight | Vulcanization Time (min) | Stress at 200% (psi) | | | Tensile Strength (psi) | | | Elongation (%) | | | Hardness | | |
|---|---|---|---|---|---|---|---|---|---|---|---|---|---|---|---|
| | | | | Un-Aged | Aged 4days | Aged 7days | Un-Aged | Aged 4days | Aged 7days | Un-Aged | Aged 4days | Aged 7days | Un-Aged | Aged 4days | Aged 7days |
| A | Nickel (II) diisobutyldithiocarbamate | 1 | 20 | 1270 | 1550 | 1240 | 1640 | 1800 | 1420 | 440 | 240 | 220 | 70 | 72 | 69 |
| | | | 30 | 1290 | 1550 | 1100 | 1660 | 1790 | 1290 | 400 | 240 | 220 | 71 | 72 | 67 |
| | | | 45 | 1410 | 1570 | 1000 | 1730 | 1820 | 1220 | 350 | 230 | 220 | 72 | 72 | 66 |
| B | Nickel (II) di-sec-butyldithiocarbamate | 1 | 20 | 1230 | 1590 | 1300 | 1660 | 1870 | 1500 | 400 | 240 | 230 | 70 | 72 | 68 |
| | | | 30 | 1270 | 1580 | 1380 | 1690 | 1870 | 1560 | 360 | 240 | 230 | 71 | 72 | 67 |
| | | | 45 | 1290 | 1620 | 1320 | 1730 | 1860 | 1470 | 360 | 240 | 230 | 72 | 72 | 66 |
| C | Nickel (II) diisopropyldithiocarbamate | 1 | 20 | 1230 | 1630 | 1290 | 1690 | 1820 | 1430 | 400 | 230 | 220 | 71 | 73 | 69 |
| | | | 30 | 1280 | 1670 | 1170 | 1690 | 1870 | 1320 | 370 | 230 | 220 | 72 | 73 | 68 |
| | | | 45 | 1400 | 1670 | 1080 | 1760 | 1870 | 1280 | 350 | 230 | 230 | 73 | 73 | 67 |
| D | Nickel (II) di-n-butyldithiocarbamate | 1 | 20 | 1270 | 1620 | 800 | 1660 | 1810 | 970 | 400 | 230 | 250 | 71 | 73 | 67 |
| | | | 30 | 1350 | 1670 | 800 | 1710 | 1800 | 950 | 360 | 260 | 250 | 72 | 73 | 64 |
| | | | 45 | 1400 | 1640 | 730 | 1770 | 1810 | 880 | 340 | 220 | 250 | 73 | 73 | 63 |
| E | Nickel (II) di-n-propyldithiocarbamate | 1 | 20 | 1210 | 1650 | 920 | 1670 | 1820 | 1100 | 470 | 220 | 240 | 71 | 74 | 67 |
| | | | 30 | 1310 | 1630 | 830 | 1680 | 1770 | 1000 | 380 | 210 | 250 | 72 | 74 | 65 |
| | | | 45 | 1400 | 1610 | 760 | 1680 | 1720 | 920 | 330 | 210 | 250 | 73 | 74 | 64 |
| F | Zinc diisopropyldithiocarbamate | 1 | 20 | 1180 | 810 | melted | 1510 | 1080 | melted | 360 | 290 | melted | 70 | 66 | melted |
| | | | 30 | 1190 | 900 | | 1530 | 1150 | | 360 | 270 | | 71 | 66 | |
| | | | 45 | 1260 | 900 | | 1600 | 1150 | | 340 | 260 | | 72 | 67 | |
| G | None | — | 20 | 1310 | 850 | 150 | 1680 | 1050 | 150 | 410 | 250 | 250 | 70 | 66 | 57 |
| | | | 30 | 1380 | 950 | 200 | 1720 | 1120 | 200 | 400 | 250 | 250 | 71 | 66 | 57 |
| | | | 45 | 1450 | 975 | 200 | 1780 | 1150 | 200 | 360 | 250 | 250 | 72 | 67 | 56 |

The results demonstrate the superior aging qualities imparted to vulcanizates A, B and C by the antioxidants of the invention as compared with vulcanizates D, E and F. The loss in tensile strength and elongation upon aging vulcanizates A, B, and C for 7 days is relatively small.

Moreover, vulcanizates A, B and C were smooth and dry in appearance after aging whereas vulcanizates D, E and F were tacky.

It is manifest from this example that the nickel salts of branched-chain dialkyldithiocarbamates of the invention provide superior antioxidant properties in epihalohydrin polymers.

Having set forth the general nature and specific embodiments of the present invention, the true scope is now particularly pointed out in the appended claims.

What is claimed is:

1. A composition having improved aging resistance comprising a polymer selected from the group consisting of a homopolymer of epihalohydrin and copolymers of epihalohydrin with an epoxide and a sufficient amount of a nickel (II) salt of a branched-chain dialkyldithiocarbamate having 3 to 5 carbon atoms in each alkyl group to impart said improved aging resistance to the composition.

2. The composition according to claim 1 wherein the nickel salt is nickel (II) diisobutyldithiocarbamate.

3. The composition according to claim 1 wherein the nickel salt is nickel (II) di-sec-butyldithiocarbamate.

4. The composition according to claim 1 wherein the nickel salt is nickel (II) diisopropyldithiocarbamate.

5. The composition according to claim 1 wherein the polymer is epichlorohydrin homopolymer.

6. A process for improving the aging resistance of a polymer selected from the group consisting of a homopolymer of epihalohydrin and copolymers of epihalohydrin with an epoxide comprising compounding the polymer with a sufficient amount of a nickel (II) salt of a branched chain dialkyldithiocarbamate having 3 to 5 carbon atoms in each alkyl group to impart said improved aging resistance and curing to form a vulcanizate.

7. The process according to claim 6 wherein the nickel salt is nickel (II) diisobutyldithiocarbamate.

8. The process according to claim 6 wherein the nickel salt is nickel (II) di-sec-butyldithiocarbamate.

9. The process according to claim 6 wherein the nickel (II) salt is diisopropyldithiocarbamate.

10. The process according to claim 6 wherein the epihalohydrin polymer is epichlorohydrin homopolymer.

11. The composition according to claim 1 wherein the polymer is a copolymer of epichlorohydrin and ethylene oxide.

12. The process according to claim 6 wherein the polymer is a copolymer of epichlorohydrin and ethylene oxide.

* * * * *

UNITED STATES PATENT AND TRADEMARK OFFICE
CERTIFICATE OF CORRECTION

PATENT NO. : 4,006,119
DATED : February 1, 1977
INVENTOR(S) : Howard C. Beadle and Irving Gibbs It is certified that error appears in the above-identified patent and that said Letters Patent are hereby corrected as shown below:

Column 1, line 17, "oils seals" should be --oil seals--;
Column 1, lines 28 & 29, "dialkyltithiocarbamates" should read --dialkyldithiocarbamates--;
Column 1, line 33, "10646(b)" should be --10646(b))--;
Column 1, line 39, "4715n" should be --47154n--;
Column 1, line 40, "(137686h)" should be --137686h)--;
Column 1, line 66, "branchedchain" should read --branched-chain--
Column 2, line 3, "opihalohydrin" should be --epihalohydrin--;
Column 2, line 11, "sulfates" should read --sulfate--;
Column 2, line 54, "haloalkoxyalkyl-substutited" should read --haloalkoxyalkyl-substituted--; and
Column 6, line 4, "branched chain" should read --branched-chain--

Signed and Sealed this

Twenty-eighth Day of June 1977

[SEAL]

Attest:

RUTH C. MASON
Attesting Officer

C. MARSHALL DANN
Commissioner of Patents and Trademarks